United States Patent
Yang et al.

(10) Patent No.: US 11,308,255 B2
(45) Date of Patent: Apr. 19, 2022

(54) GENERATION OF LAYOUT INCLUDING POWER DELIVERY NETWORK

(71) Applicant: TAIWAN SEMICONDUCTOR MANUFACTURING CO., LTD., Hsinchu (TW)

(72) Inventors: Chung-Chieh Yang, Hsinchu County (TW); Tai-Yi Chen, Hsinchu County (TW); Yun-Ru Chen, Keelung (TW); Yung-Chow Peng, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 35 days.

(21) Appl. No.: 16/886,550

(22) Filed: May 28, 2020

(65) Prior Publication Data

US 2021/0374318 A1    Dec. 2, 2021

(51) Int. Cl.
*G06F 30/398* (2020.01)
*G06F 30/392* (2020.01)
*G06F 30/367* (2020.01)
*G06F 30/3953* (2020.01)
*G06F 30/373* (2020.01)
*G06F 119/06* (2020.01)

(52) U.S. Cl.
CPC .......... *G06F 30/398* (2020.01); *G06F 30/367* (2020.01); *G06F 30/392* (2020.01); *G06F 30/3953* (2020.01); *G06F 30/373* (2020.01); *G06F 2119/06* (2020.01)

(58) Field of Classification Search
CPC .... G06F 30/398; G06F 30/392; G06F 30/367; G06F 30/3953; G06F 30/3038; G06F 30/373; G06F 2119/06
USPC ....... 716/111, 106, 109, 120, 127, 133, 136; 703/15
See application file for complete search history.

(56) References Cited

U.S. PATENT DOCUMENTS

| | | | | |
|---|---|---|---|---|
| 8,656,329 B1* | 2/2014 | Kukal | ................... | G06F 30/367 |
| | | | | 716/109 |
| 9,223,919 B2* | 12/2015 | Yu | .......................... | G06F 30/398 |
| 9,703,921 B1* | 7/2017 | Lin | ....................... | G06F 30/367 |
| 10,678,991 B2* | 6/2020 | Ku | ......................... | G06F 30/394 |
| 10,817,645 B2* | 10/2020 | Sharma | ................. | G06F 30/394 |
| 11,030,383 B2* | 6/2021 | Ku | ......................... | G06F 30/398 |

(Continued)

OTHER PUBLICATIONS

Synopsys, "What is Electromigration", https://www.synopsys.com/glossary/what-is-electromigration.html, 2021, 6 pages. (Year: 2021).*

(Continued)

*Primary Examiner* — Phallaka Kik
(74) *Attorney, Agent, or Firm* — Maschoff Brennan

(57) ABSTRACT

A method is disclosed including: generating, based on design information for an integrated circuit, a circuit design that includes an initial power delivery network (PDN) for the integrated circuit; performing a pre-layout simulation to the circuit design that includes the initial power delivery network, to determine whether the circuit design meets a predetermined specification; and when the circuit design meets the predetermined specification, generating a power delivery network layout of the integrated circuit, and generating, after the power delivery network layout is generated, a circuit layout of the integrated circuit.

20 Claims, 14 Drawing Sheets

(56) References Cited

U.S. PATENT DOCUMENTS

| | | | | |
|---|---|---|---|---|
| 2006/0123366 A1* | 6/2006 | Ogawa | ............... | G06F 30/367 |
| | | | | 716/115 |
| 2007/0271081 A1* | 11/2007 | Johnson | ............... | G06F 30/20 |
| | | | | 703/18 |
| 2008/0098340 A1* | 4/2008 | Oh | ............... | G06F 30/392 |
| | | | | 716/111 |
| 2008/0244497 A1* | 10/2008 | Zhao | ............... | G06F 30/367 |
| | | | | 716/130 |
| 2014/0114636 A1* | 4/2014 | Daloukas | ............. | G06F 30/367 |
| | | | | 703/14 |
| 2017/0023961 A1* | 1/2017 | Lin | ............... | G06F 30/394 |
| 2021/0117586 A1* | 4/2021 | Wu | ............... | H02J 3/00 |

OTHER PUBLICATIONS

Wikipedia, "Electromigration", https://en.wikipedia.org/wiki/Electromigration, last edited May 11, 2021, 14 pages. (Year: 2021).*

* cited by examiner

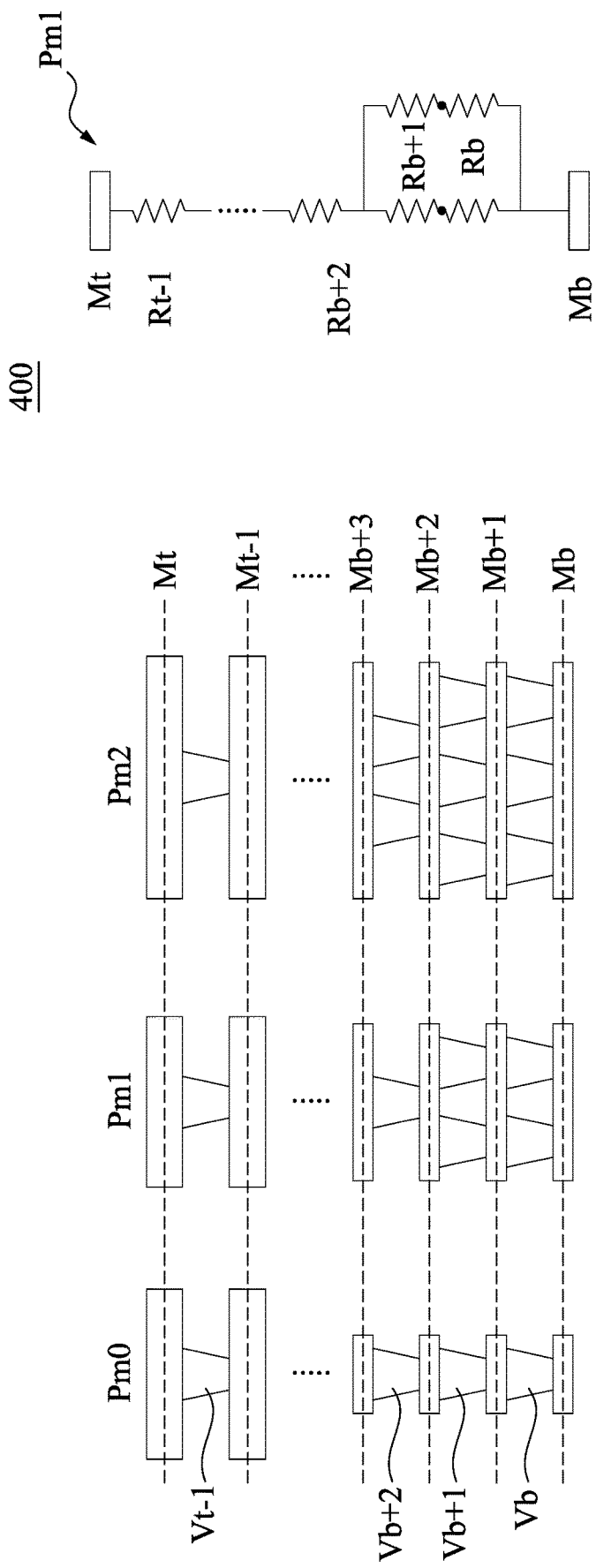

GENERATION OF LAYOUT INCLUDING POWER DELIVERY NETWORK

BACKGROUND

An integrated circuit (IC) typically includes semiconductor devices represented in an IC layout. The IC layout is generated from, for example, an electrical diagram of the IC. At various steps during the IC design process, from IC design to the IC layout for actual manufacturing of the IC, various checking and testing processes are performed to ensure that the IC can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a schematic diagram of cross-section view of various pillars that are able to be applied in the power delivery network 200 of FIG. 2, according to some embodiments of the present disclosure.

FIG. 4B is a schematic diagram showing an equivalent circuit of the pillar in FIG. 4A, according to some embodiments of the present disclosure.

DETAILED DESCRIPTION

Figure 1:
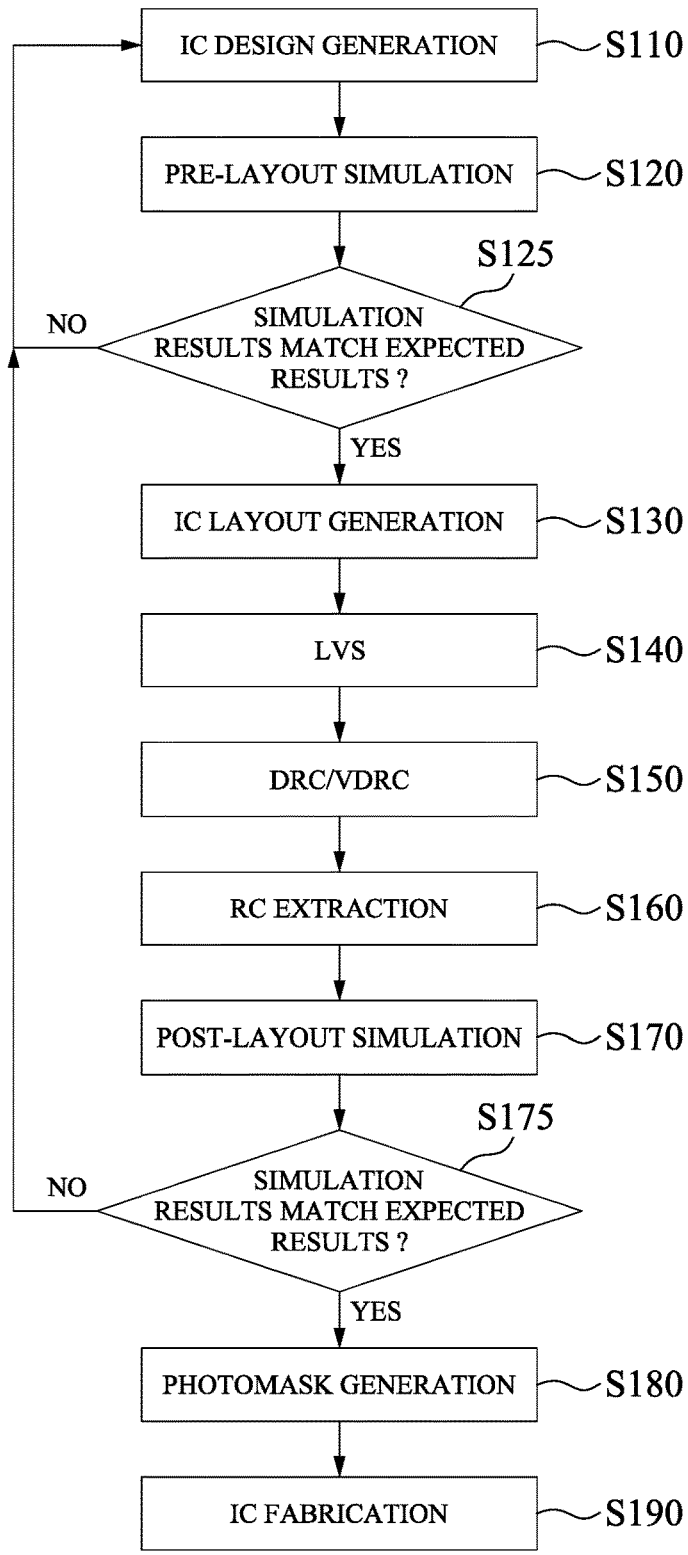
FIG. 1 is a flow chart of at least a portion of an integrated circuit (IC) design flow, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled", and the term "connected" may be termed as "electrically connected". "Coupled" and "connected" may also be used to indicate that two or more elements cooperate or interact with each other.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flow chart of at least a portion of an integrated circuit (IC) design flow 100, according to some embodiments of the present disclosure. For illustration in FIG. 1, the IC design flow 100 includes operations S110, S120, S130, S140, S150, S160, and S170. The IC design flow 100 is performed to test a design of an IC before manufacturing the IC. In some embodiments, the IC design flow 100 utilizes one or more electronic design automation (EDA) tools for testing the design of the IC. The EDA tools, in some embodiments, are one or more sets of executable instructions for execution by a processor (e.g., processor 1320 of FIG. 13), a controller, a programmed computer, or the like, to perform the indicated functionality.

In operation S110, a circuit design of an IC is generated. The circuit design of the IC is provided by a circuit designer, and/or is stored in a memory (e.g., memory 1310 of FIG. 13), in some embodiments. In some embodiments, the circuit design of the IC includes an IC schematic diagram of the IC. In some embodiments, the IC schematic diagram is generated or provided in the form of a schematic netlist, such as a Simulation Program with Integrated Circuit Emphasis (SPICE) netlist. Other data formats for describing the design are usable in some embodiments. In some embodiments, a SPICE simulation is performed on the SPICE netlist. Other simulation tools are usable, in place of or in addition to the SPICE simulation, in other embodiments.

In operation S120, a pre-layout simulation is performed, for example, by an EDA tool, on the circuit design to determine whether the circuit design meets a predetermined specification. If the circuit design does not meet the predetermined specification, at least part of the IC is re-designed. In some embodiments, the pre-layout simulation is performed by several steps to determine whether each part of the circuit design meets the corresponding requirements in the predetermined specification. If a part of the circuit design does not meet the predetermined specification, the part of the circuit design is re-designed.

In operation S125, the pre-layout simulation results from operation S120 are compared to expected pre-layout simulation results. When the pre-layout simulation results do not match the expected simulation results, the flow is returned back to operation S110 to generate a new circuit design of the IC, and then the following operations are performed again accordingly. On the other hand, when the pre-layout simulation results match the expected simulation results, the flow proceeds to operation S130.

In operation S130, a design layout (or layout diagram) of the IC is generated based on the circuit design. In some embodiments, the design layout is generated in the form of a Graphic Design System (GDS) file by an EDA tool. Other tools and/or data formats for describing the layout are usable in various embodiments.

In operation S140, a layout-versus-schematic (LVS) check is performed. The LVS check is performed to ensure that the generated layout corresponds to the circuit design. In some embodiments, an LVS checking tool, which is, for example, implemented by an EDA tool, recognizes electrical components as well as connections therebetween from the pattern of the generated layout. The LVS checking tool then generates a layout netlist representing the recognized electrical components and connections. The layout netlist generated from the design layout is compared, by the LVS checking tool, with the schematic netlist of the circuit design. If the two netlists match within a matching tolerance, the LVS check is passed. Otherwise, correction is made to at least one of the design layout or the circuit design.

In operation S150, a design rule check (DRC) is performed, for example, by an EDA tool, on the GDS file representing the design layout, to ensure that the design layout satisfies certain manufacturing design rules, to ensure manufacturability of the IC. If one or more design rules is/are violated, correction is made to at least one of the design layout or the circuit design. Examples of design rules include, but are not limited to, a width rule which specifies a minimum width of a pattern in the design layout, a spacing rule which specifies a minimum spacing between adjacent patterns in the design layout, an area rule which specifies a minimum area of a pattern in the design layout, or the like.

In some embodiments, at least one of the design rules is voltage-dependent. For example, a metal-to-via spacing rule specifies a minimum spacing between a metal pattern and an adjacent via in the design layout of the IC. In some embodiments, such a minimum spacing is dependent on a voltage expected or predicted to occur at the metal pattern or the via during an operation of the IC. Examples of further voltage-dependent design rules include, but are not limited to, metal-to-metal spacing rule, polysilicon-to-oxide definition (PO-to-OD) spacing rule, PO-to-PO spacing rule, etc. A DRC that is performed to check compliance of a layout with one or more voltage-dependent design rules is also referred to as a VDRC, in some embodiments.

In operation S160, a resistance and capacitance (RC) extraction is performed, for example, by an EDA tool, to determine or extract parasitic parameters including, for example, parasitic resistance and parasitic capacitance, of interconnects in the design layout for timing simulations in a subsequent operation.

In operation S170, a post-layout simulation is performed by a simulation tool which is implemented, for example, by an EDA tool, to determine whether the design layout meets a predetermined specification or requirement. When the simulation indicates that the design layout does not meet the predetermined specification, correction is made to at least one of the design layout or the circuit design. For example, in regard to the extracted parasitic parameters as discussed above, when the parasitic parameters cause undesirable delays, the simulation is determined to indicate that the layout does not meet the predetermined specification, and correction is then made to at least one of the design layout or the circuit design. On the other hand, when the layout meets the predetermined specification, the design layout is passed for fabrication or additional verification processes. For example, voltage drop and electromigration (EM) verification process is also performed in the post-layout simulation, in various embodiments. When the voltage drop and electromigration requirements are met during the voltage drop and electromigration verification process, a final design layout for the IC is generated. The term "voltage drop" is also referred to as "IR drop" in the art, and for sake of brevity, is referred to as "IR drop" hereinafter in the present disclosure.

In operation S175, the post-layout simulation results from operation S170 are compared to expected post-layout simulation results. When the post-layout simulation results do not match the expected simulation results, the flow is returned back to operation S110 to generate a new circuit design of the IC, and then the following operations are performed again accordingly. On the other hand, when the post-layout simulation results match the expected simulation results, the flow proceeds to operation S180.

In operation S180, photomasks are generated based on the design layout (or layout diagram) of the IC from operation S130. In some embodiments, photomasks are generated by performing one or more lithographic exposures based on the IC design layout. In some embodiments, an electron-beam (e-beam) or a mechanism of multiple e-beams is used to form a pattern on a mask based on the IC design layout. In operation S190, the IC is using the photomasks from operation S180. In some embodiments, fabricating the IC includes performing one or more lithographic exposures at least indirectly on the IC design layout.

It is understood that additional operations can be provided before, during, and after the operations shown by FIG. 1, and some of the operations in FIG. 1 can be replaced, eliminated or interchanged, for additional embodiments of the method. For example, in various embodiments, the RC extraction in operation S160 and the post-layout simulation in operation S170 are omitted.

As discussed above, the IR drop and EM verification process is normally performed in the post-layout simulation, which occurs late in the design process. Accordingly, if it is determined that the IR drop and EM requirements are not met, the IC design process must be completely reworked. Specifically, the operations as discussed above with respect to FIG. 1 must be iteratively repeated if the IR drop and EM requirements are not met. As a result, completely reworking the IC design in this manner adds a significant amount of time to the IC design process.

To address the above issues, disclosed herein are current-aware integrated circuit (IC) design methods and systems, which generates an appropriate power delivery network (PDN) for an IC early in the design process (e.g., operation S110), in order to generate, in a timely manner, an IC design layout. With the power delivery network, an IR drop and/or EM pre-check process is able to be performed, in the pre-layout simulation (e.g., operation S120), to the power delivery network, in addition to the IR drop and EM verification process in the post-layout simulation. Accordingly, the IR drop and/or EM issues can be optimized early in the pre-layout simulation. The following detail discussions are made for further explanation.

In some embodiments of FIG. 1, a circuit design including a power delivery network (PDN) for an IC is generated, in operation S110. To generate the circuit design including the power delivery network, corresponding design information in a form of process design kit (PDK) is also provided and stored in a memory (e.g., memory 1310 of FIG. 13). Accordingly, the above design information is also referred to as "PDK" in some embodiments. The above design information is also able to be accessed by one or more processors (e.g., processor 1320 of FIG. 13) of a design system executing EDA tools on a computer-aided design (CAD) system for the purpose of designing an IC.

To generate the circuit design including the power delivery network, in some embodiments, the above design information (or PDK) includes parameters associated with power rails and conductive pillars in the power delivery network, which will be discussed below with reference to FIG. 2. In some other embodiments, the design information (or PDK) also includes a set of foundry specific files including, but not limited to, technology files for a specific technology node, a library element, library design rules, and the like. Alternatively stated, the design information (or PDK) includes parameters indicating a predetermined specification of the circuit design for the IC. For example, the parameters include the voltage drop across the power delivery network, the current which flows through the power delivery network, the resistance of pillar, the number of power rails in the power delivery network, the number of pillars, a maximum pillar density, and the like. In some embodiments, the EDA tools are executed to obtain these parameters from the PDK. In some embodiments, the parameters of the design information (or PDK) are adjustable via an input/output interface.

Figure 2:
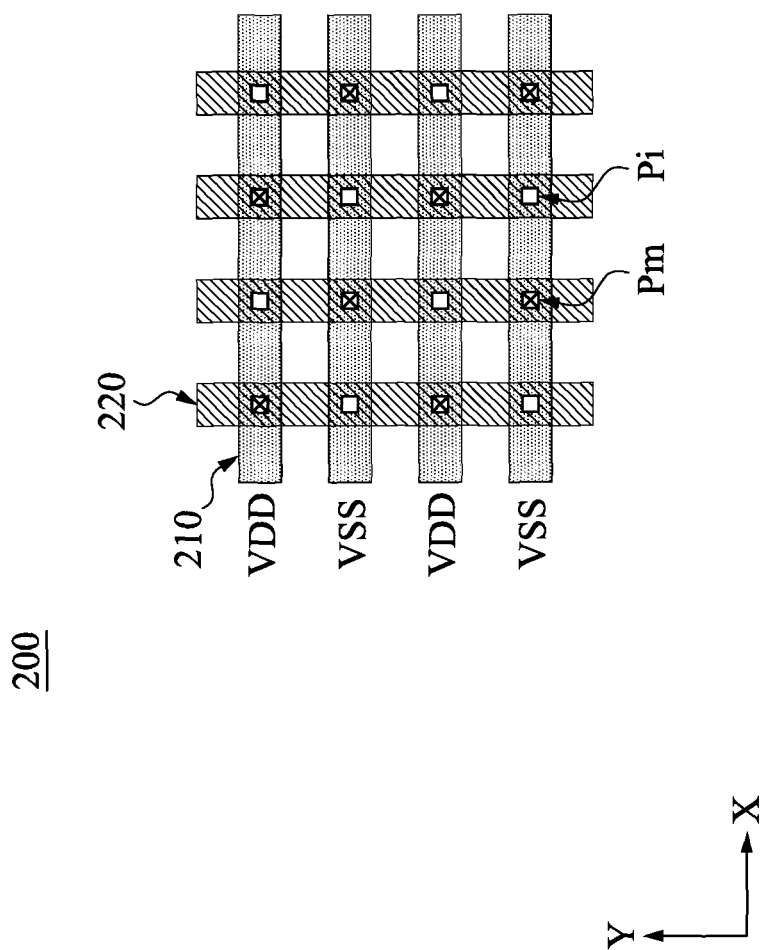
FIG. 2 is a schematic diagram illustrating a power delivery network generated in the method 100 of FIG. 1, according to some embodiments of the present disclosure.

FIG. 2 is a schematic diagram illustrating a power delivery network 200 generated in the method 100 of FIG. 1, according to some embodiments of the present disclosure. For illustration of FIG. 2, the power delivery network 200 includes power rails 210 and power rails 220 that are intersected with each other in a layout view. The power rails 210 are uniformly spaced apart from each other and have a same width, and are arranged in a conductive layer Mt−1 along, for example, an X direction in FIG. 2. The power rails 220 are uniformly spaced apart from each other and have a same width, and are arranged in a conductive layer Mt (e.g., top metal layer) above the conductive layer Mt−1, along, for example, a Y direction in FIG. 2. Moreover, the power rails 210 are arranged in a pattern of being coupled to a supply voltage VDD (e.g., power voltage) and a supply voltage VSS (e.g., ground voltage) alternately. The power rails 220 are also arranged in a pattern of being coupled to the supply voltages VDD and VSS alternately. Accordingly, with the power rails 210 and 220 being arranged in a form of mesh, the power delivery network 200 is also referred to as a power/ground mesh, in some embodiments. In some embodiments, the power rails 210 and 220 are made of conductive material including, for example, metal.

For illustration of FIG. 2, the power delivery network 200 also includes pillars Pm and pillars Pi. Each one of the pillars Pm is indicated by a box with an internal cross, and each one of the pillars Pi is indicated by an empty box, as shown in FIG. 2. In some embodiments, each one of the pillars Pi is coupled one of the power rails 210 in the conductive layer Mt−1, and each one of the pillars Pm is coupled through the corresponding power rail 210 in the conductive layer Mt−1 to one of the power rails 220 in the conductive layer Mt, which will be discussed below with reference to FIG. 3A for further explanation. With the above configurations, the pillar Pm is also referred to as "major pillar" and the pillar Pi is also referred to as "intra pillar" in the art and hereinafter in the present disclosure.

Although only one power rail 210, only one power rail 220, only one pillar Pi, and only one pillar Pm are labeled for simplicity of illustration, it is understood that each one of the labels collectively represents the other like elements as shown in FIG. 2.

As discussed above, in some embodiments, the power delivery network 200 is built with layers, and there are vias that are disposed between the layers and configured to conduct the electricity from the input terminals to the output terminals. For ease of understanding, the power delivery network 200 of FIG. 2 is also discussed below with reference to FIG. 3A.

Figure 3B:
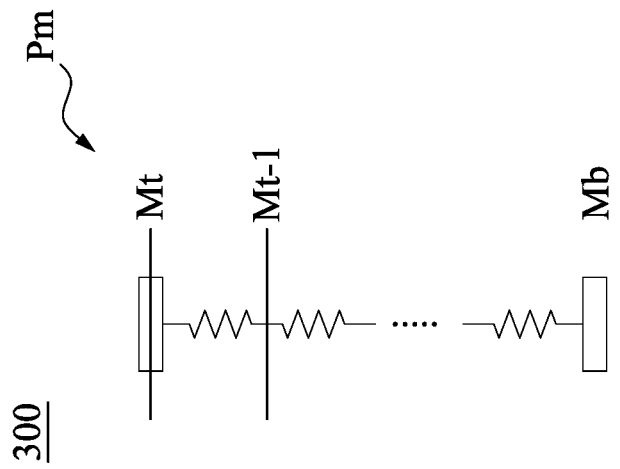
FIG. 3B is a schematic diagram showing an equivalent circuit of the pillar in FIG. 3A, according to some embodiments of the present disclosure.
Figure 3A:
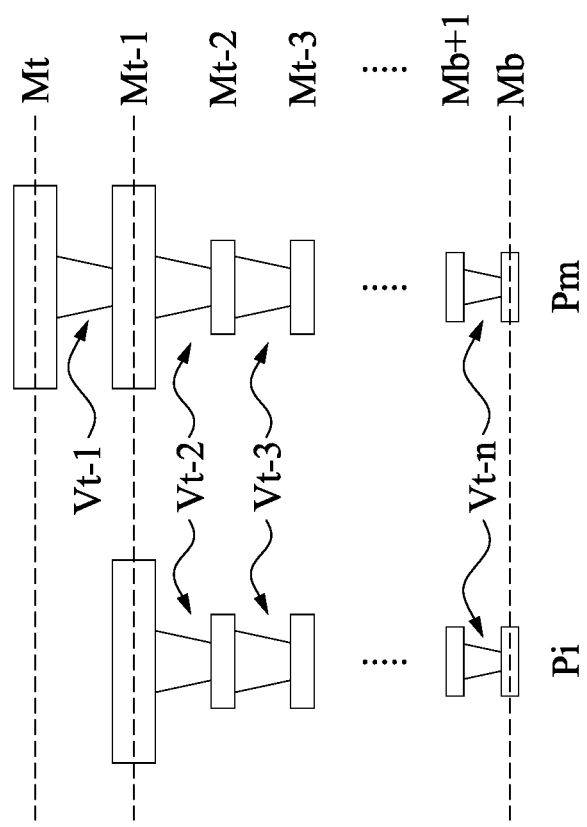
FIG. 3A is a schematic diagram of cross-section view of pillars in the power delivery network of FIG. 2, according to some embodiments of the present disclosure.

FIG. 3A is a schematic diagram of cross-section view of pillars in the power delivery network 200 of FIG. 2, according to some embodiments of the present disclosure. In FIG. 3A, one major pillar Pm and one intra pillar Pi are shown for simplicity of illustration. As illustratively shown in FIG. 3A, each one of the major pillar Pm and the intra pillar Pi is configured with vias (collectively indicated as Vt) in respective layers. For illustration of the major pillar Pm, the vias Vt are arranged in one stack structure from a top conductive layer Mt which is coupled to, for example, the input terminal, to a bottom conductive layer Mb which is coupled to, for example, the output terminal. For illustration of the intra pillar Pi, the vias Vt are in the other stack structure from a conductive layer Mt−1 beneath the top conductive layer Mt to the bottom conductive layer Mb. Detailed illustrations of the major pillar Pm and the intra pillar Pi are provided below.

In the illustration of FIG. 3A, the major pillar Pm includes a via Vt−1, a via Vt−2, a via Vt−3, . . . and a via Vt−n. The via Vt−1 is disposed between the top conductive layer Mt and the conductive layer Mt−1, the via Vt−2 is disposed between the conductive layer Mt−1 and the conductive layer Mt−2, the via Vt−3 is disposed between the conductive layer Mt−2 and the conductive layer Mt−3, and the via Vt−n is disposed between the conductive layer Mb+1 and the bottom conductive layer Mb. The intra pillar Pi includes a via Vt−2, a via Vt−3, and a via Vt−n. Similarly, the via Vt−2 is disposed between the conductive layer Mt−1 and the conductive layer Mt−2, the via Vt−3 is disposed between the conductive layer Mt−2 and the conductive layer Mt−3, and the via Vt−n is disposed between the conductive layer Mb+1 and the bottom conductive layer Mb. For ease of understanding, FIG. 3A is not illustrated with every via included in the major pillar Pm and the intra pillar Pi. However, it is understood that there may be more or less vias disposed in the major pillar Pm and/or the intra pillar Pi.

To perform IR drop and/or EM pre-check process as discussed above, the equivalent resistance of each one of the major pillar Pm and the intra pillar Pi is required. In some embodiments, the equivalent resistance of each one of the major pillar Pm and the intra pillar Pi is acquired according to an equivalent circuit of the corresponding pillar or a resistance netlist indicating the equivalent circuit.

FIG. 3B is a schematic diagram showing an equivalent circuit 300 of the major pillar Pm in FIG. 3A, according to some embodiments of the present disclosure. As shown in FIG. 3B, the equivalent circuit 300 shows, for the major pillar Pm of FIG. 3A, resistors (corresponding to respective vias of FIG. 3A) connected in series from the top conductive layer Mt to the bottom conductive layer Mb. Accordingly, the equivalent resistance of the major pillar Pm is able to be calculated and acquired by summing up the resistances of the resistors connected in series.

In some embodiments, with different configurations of the major pillar Pm and the intra pillar Pi, the equivalent circuit 300 of the major pillar Pm is different from an equivalent circuit of the intra pillar Pi. Accordingly, the equivalent resistance of the intra pillar Pi is different from the equivalent resistance of the major pillar Pm.

The above configurations of the major pillar Pm and the intra pillar Pi are given for illustrative purposes. Various configurations of the major pillar Pm and the intra pillar Pi are within the contemplated scope of the present disclosure. For example, in various embodiments, the major pillar Pm or the intra pillar Pi includes various numbers of vias between respective conductive layers, which will be discussed with reference to FIG. 4A for further explanation.

FIG. 4A is a schematic diagram of cross-section view of various major pillars that are able to be applied in the power delivery network 200 of FIG. 2, according to some embodiments of the present disclosure. As shown in FIG. 4A, the major pillars Pm0, Pm1, and Pm2 have different configurations from each other. The major pillar Pm0 corresponds to the major pillar Pm of FIG. 3A. Compared to the major pillar Pm0, the number of vias disposed between at least two adjacent layers in the major pillars Pm1 and/or Pm2 is larger than 1, in some embodiments. For example, in FIG. 4A, the numbers of vias disposed between the conductive layer Mb+1 and the bottom conductive layer Mb of the major pillars Pm0, Pm1, and Pm2 are 1, 2, and 3, respectively. For another example, the numbers of vias disposed between the conductive layer Mb+3 and the conductive layer Mb+2 of the major pillars Pm0, Pm1, and Pm2 are 1, 1, and 2, respectively.

As illustratively shown in FIG. 4A, when the number of vias disposed between any two adjacent layers is larger than 1, the vias are disposed and coupled in parallel between the two adjacent layers. Because more vias in a conductive layer provide more conductivity, the more vias of one layer thus result in a smaller resistance of the same layer. Alternatively stated, the resistance between two adjacent conductive layers which have two vias disposed therebetween is smaller than the resistance between the two adjacent layers which have one via disposed therebetween. Accordingly, for example in FIG. 4A, the resistance of the major pillar Pm2 is smaller than the resistance of the major pillar Pm1, and the resistance of the major pillar Pm1 is smaller than the resistance of the major pillar Pm0.

FIG. 4B is a schematic diagram showing an equivalent circuit 400 of the major pillar Pm1 in FIG. 4A, according to some embodiments of the present disclosure. As shown in FIG. 4B, the equivalent circuit 400 shows, for the major pillar Pm1 of FIG. 4A, resistors Rt−1, Rb+2, Rb+1, Rb, etc. (corresponding to respective vias of FIG. 4A) connected in series from the top conductive layer Mt to the bottom conductive layer Mb. Accordingly, the equivalent resistance of the major pillar Pm1 is able to be calculated and acquired by summing up the resistances of the resistors connected in series.

The configurations and corresponding equivalent circuits of pillars in FIGS. 4A and 4B are given for illustrative purposes. Various configurations and corresponding equivalent circuits of pillars are within the contemplated scope of the present disclosure. For example, in various embodiments, in addition to the major pillars Pm shown in FIG. 4A, the intra pillars Pi also have more than one via disposed between at least two adjacent conductive layers.

With continuous reference to FIG. 1, in some embodiments, after operation S110, the pre-layout simulation is performed to the circuit design that includes the power delivery network as discussed above, in operation S120, to determine whether the circuit design meets a predetermined specification. When the circuit design meets the predetermined specification, the method 100 proceeds to operation S130 as discussed above. For example, in operation S120, verification processes including, for example, timing and signal integrity verification, function verification, and the like, are performed to the circuit design, in order to determine whether the circuit design meets a predetermined specification.

In some embodiments, in operation S120, in addition to the above verification processes, the IR drop and/or EM pre-check process is performed to the power delivery network as discussed above, to determine whether the power delivery network meets the predetermined specification. The IR drop and EM pre-check processes will be discussed in more detail with references to FIGS. 5-9.

Figure 5:
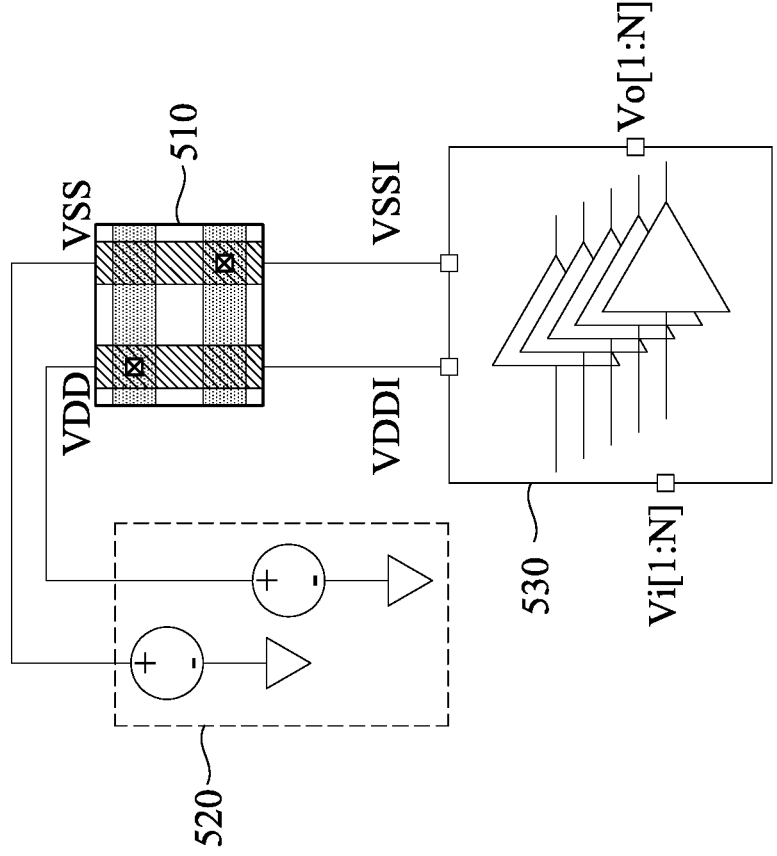
FIG. 5 is a schematic diagram of a circuit that is applicable in the IR drop pre-check process performed to the power delivery network as discussed with respect to FIG. 2, according to some embodiments of the present disclosure.

FIG. 5 is a schematic diagram of a circuit 500 that is applicable in the IR drop pre-check process performed to the power delivery network as discussed with respect to FIG. 2, according to some embodiments of the present disclosure. As illustratively shown in FIG. 5, the circuit 500 includes an operating circuit 530, a supply power circuit 520, and a power delivery network (PDN) circuit 510 which is implemented from the power delivery network 200 of FIG. 2. The PDN circuit 510 is coupled between the power supply circuit 520 and the operating circuit 530. The PDN circuit 510 is configured to transmit sufficient power to the operating circuit 530 and to withstand sufficient current while transmitting the power. Alternatively stated, the PDN circuit 510 is designed and/or configured with the existing voltage drop to transmit enough voltage to the operating circuit 530. To have the existing voltage drop, the PDN circuit 510 is able to withstand enough current corresponding to the power and the resistance thereof.

As illustratively shown in FIG. 5, the PDN circuit 510 includes input terminals configured to receive the voltages VDD and VSS from the power supply circuit 520, and output terminals configured to output voltages VDDI and VSSI to the operating circuit 530. In some embodiments, the voltage VDDI is generated from the voltage VDD deducting the IR drop across the PDN circuit 510, and the voltage VSSI is generated from the voltage VSS deducting the IR drop across the PDN circuit 510.

In some embodiments, the operating circuit 530 is implemented by a driver circuit, and configured to operate with a peak current of, for example, 50 mA. When the operating circuit 530 operates with the peak current, the peak current flows across the PDN circuit 510, and accordingly, the IR drop across the PDN circuit 510 can be calculated and obtained based on the peak current and the resistance of the PDN circuit 510, which will be discussed in more detail below. The above IR drop across the PDN circuit 510 is then used for determination of whether the IR drop meets an IR drop specification.

Figure 6:
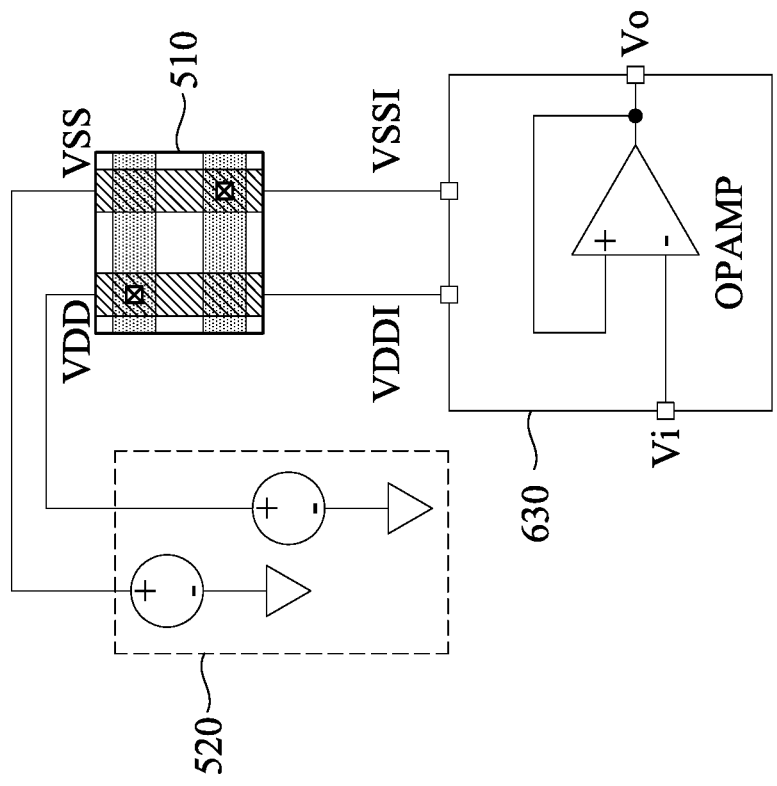
FIG. 6 is a schematic diagram of a circuit that is applicable in the EM pre-check process performed to the power delivery network as discussed with respect to FIG. 2, according to some embodiments of the present disclosure.

FIG. 6 is a schematic diagram of a circuit 600 that is applicable in the EM pre-check process performed to the power delivery network as discussed with respect to FIG. 2, according to some embodiments of the present disclosure. Compared to the embodiments of FIG. 5, except for including the PDN circuit 510 and the supply power circuit 520 as discussed above, the circuit 600 of FIG. 6 also includes an operating circuit 630. The PDN circuit 510 is coupled between the power supply circuit 520 and the operating circuit 630.

In some embodiments, the operating circuit 630 is implemented by an operational amplifier (OP AMP) circuit, and configured to operate with an average current of, for example, 1 mA. When the operating circuit 630 operates with the average current, this indicates that the average current is a minimum current, required for the operating circuit 630, to flow through the PDN circuit 510. The above average current flowing through the PDN circuit 510 is then used for determination of whether the current meets an EM specification.

Figure 7:
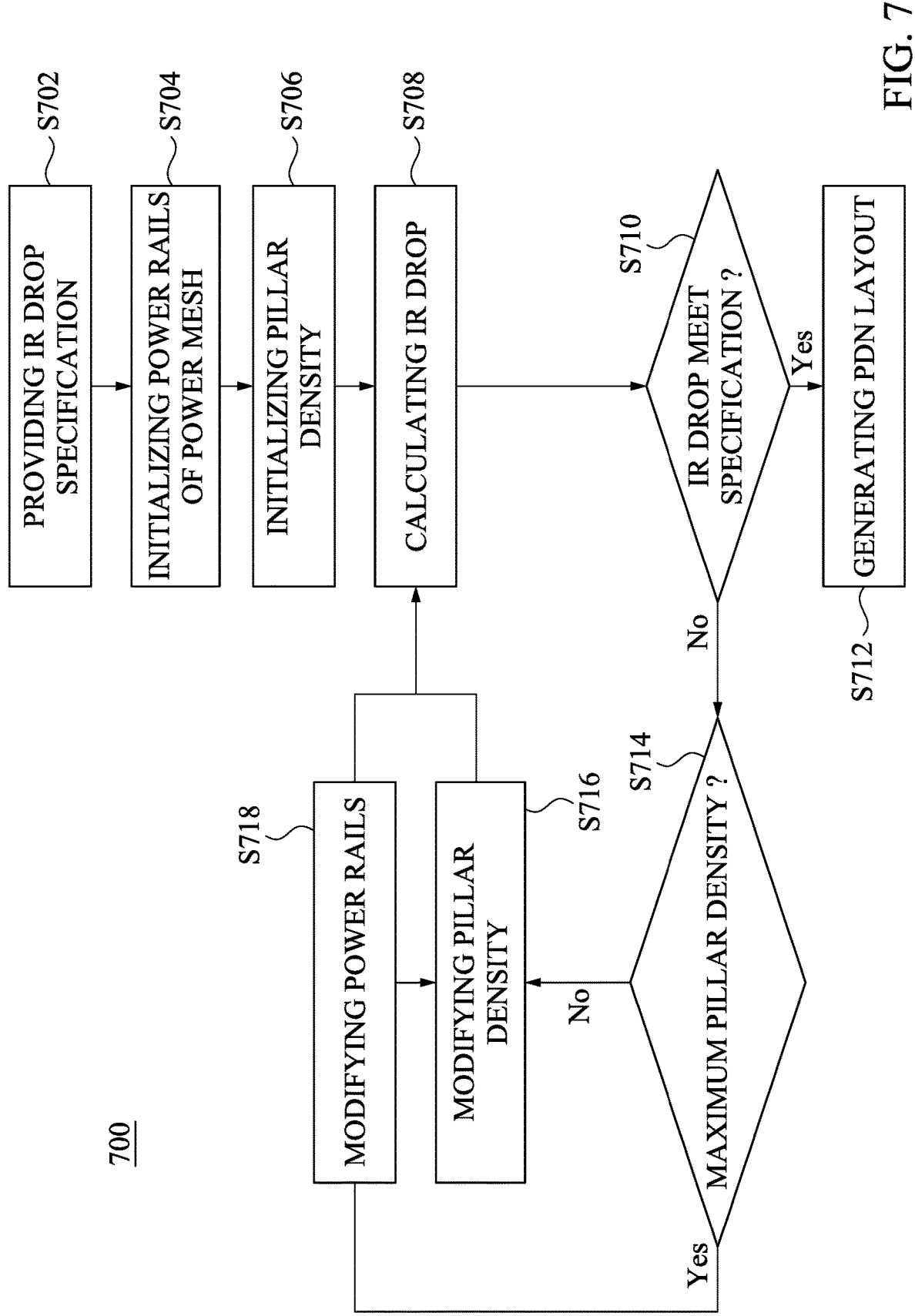
FIG. 7 is a flow chart of a method applicable in the IR drop pre-check process performed to the power delivery network as discussed with respect to FIG. 2, according to some embodiments of the present disclosure.

FIG. 7 is a flow chart of a method 700 applicable in the IR drop pre-check process performed to the power delivery network as discussed with respect to FIG. 2, according to some embodiments of the present disclosure. In some embodiments, the method 700 is performed by executing the EDA tools to perform the IR drop pre-check process to the power delivery network, in order to determine whether the IR drop of the power delivery network meets the IR drop specification.

Figure 8A:
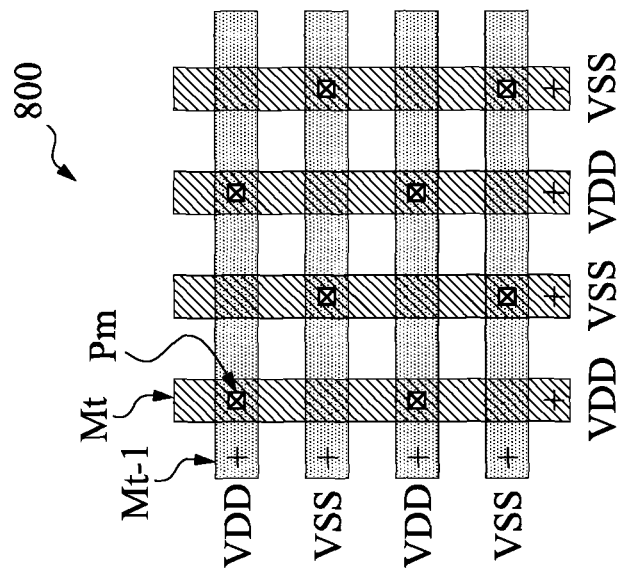
FIG. 8A is a schematic diagram illustrating a power delivery network 800 in accordance with some embodiments of the present disclosure.
Figure 8B:
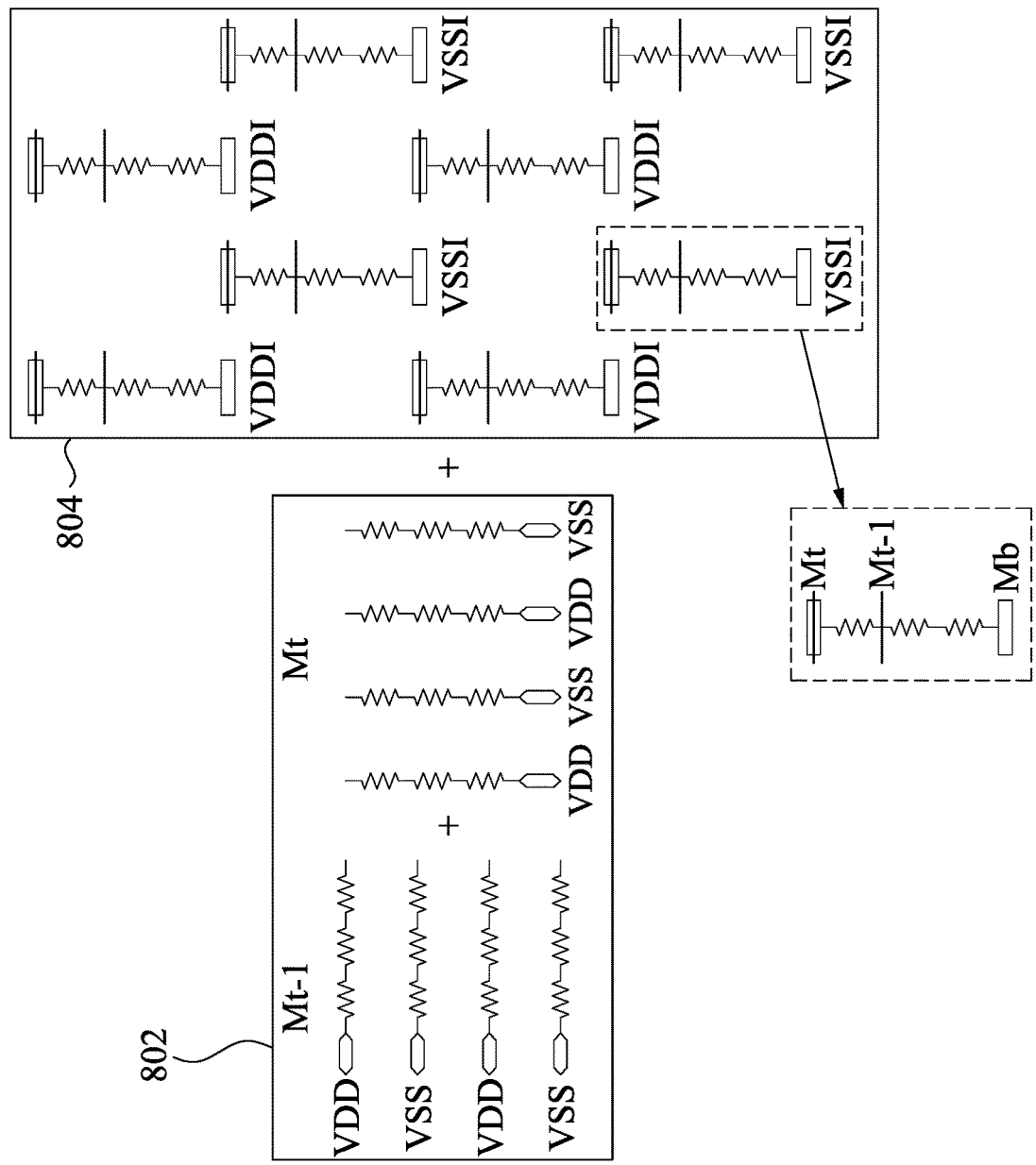
FIG. 8B is a schematic diagram illustrating equivalent resistance networks of the power delivery network in FIG. 8A, in accordance with some embodiments of the present disclosure.
Figures 8C, 8D, 8E:
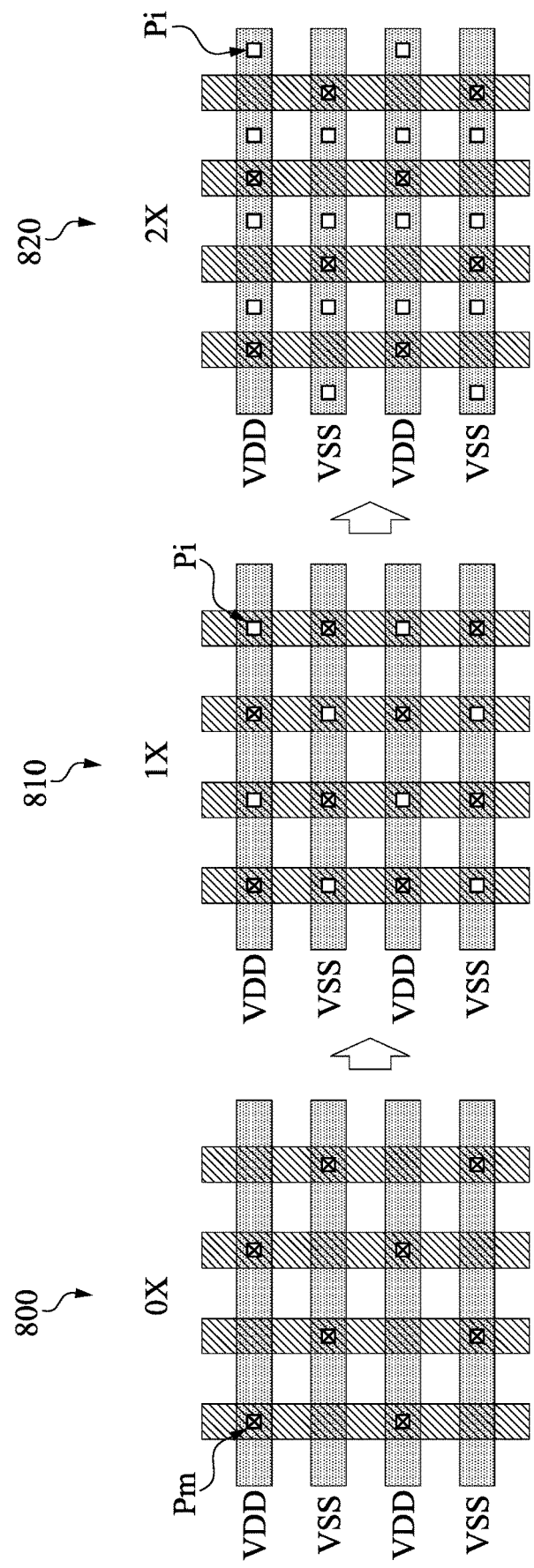
FIGS. 8C-8E are schematic diagrams illustrating variations of the power delivery network of FIG. 8A, in accordance with various embodiments of the present disclosure.

FIG. 8A is a schematic diagram illustrating a power delivery network 800 in accordance with some embodiments of the present disclosure. FIG. 8B is a schematic diagram illustrating equivalent resistance networks 802 and 804 of the power delivery network 800 in FIG. 8A, in accordance with some embodiments of the present disclosure. FIGS. 8C-8E are schematic diagrams illustrating variations of the power delivery network 800 of FIG. 8A, in accordance with various embodiments of the present disclosure. For ease of understanding, the method 700 is discussed below with reference to FIGS. 8A-8E.

For illustration of FIG. 8A, the power delivery network 800 includes four power rails disposed in the conductive layer Mt−1, and four power rails disposed in the top conductive layer Mt above the conductive layer Mt−1, which together form a power mesh as discussed above. Moreover, the power delivery network 800 further includes eight major pillars Pm disposed at the intersections of the power rails in the top conductive layer Mt and the conductive layer Mt−1, in a layout view. The numbers of the power rails and the major pillars of the power delivery network 800 are given for illustrative purposes. Various numbers of the power rails and the major pillars of the power delivery network 800 are within the contemplated scope of the present disclosure.

For the method 700 of FIG. 7, in operation S702, an IR drop specification is provided. In some embodiments, the IR drop specification includes parameters in the PDK as discussed above. With reference to FIG. 8A, the above parameters are associated with an IR drop across the power delivery network 800. In some embodiments, the IR drop specification is stored in a memory (e.g., memory 1310 of FIG. 13) for a processor (e.g., processor 1320 of FIG. 13) to access.

In operation S704 of FIG. 7, power rails of a power mesh are initialized. In some embodiments, to initialize the power rails of the power mesh, the number of power rails arranged in rows and the number of power rails arranged in columns, of the power mesh, are determined. For example, in the power delivery network 800 of FIG. 8A, the number of power rails arranged in rows is four as determined, and the number of power rails arranged in columns is four as determined. In some embodiments, the EDA tools are executed to generate the design including the power delivery network 800 with the determined number of the power rails. In some embodiments, when the number of the power rails is determined, an area of the power delivery network 800 is determined because the distance between two of the power rails is fixed.

In operation S706 of FIG. 7, a pillar density of pillars in a power delivery network is initialized. In some embodiments, to initialize the pillar density, a number of major pillars and/or intra pillars as discussed above are initially determined, and the pillars are arranged in the power delivery network. For example, eight major pillars Pm are initially determined and arranged in the power delivery network 800 as shown in FIG. 8A. In some embodiments, the EDA tools are executed to generate the design including the power delivery network 800 with the determined number of the pillars. With the determined number of pillars, the pillar density of pillars is determined accordingly.

In operation S708 of FIG. 7, the IR drop of the power delivery network is calculated. In some embodiments, to calculate the IR drop of the power delivery network, a calculation of the IR drop across the power rails and conductive pillars that are coupled to the power rails of the power delivery network is performed, which will be discussed in more detail below.

After the operation S708, the IR drop as calculated is compared with the IR drop specification in operation S710, to determine whether the IR drop meets the IR drop specification. When the IR drop as calculated meets the IR drop specification, the operation S712 is performed in which a power delivery network layout is generated, which also corresponds to the operation S130 of FIG. 1. On the other hand, when the IR drop as calculated does not meet the IR drop specification, the method 700 proceeds to operation S714. Examples are provided below for further explanation.

For illustration of FIG. 8A and FIG. 8B, the resistance of the power delivery network 800 is equivalent to a resistance of the equivalent resistance network 802 plus a resistance of the equivalent resistance network 804. The equivalent resistance network 802 includes resistances of the power rails in the conductive layer Mt−1 and resistances of the power rails in the top conductive layer Mt. The equivalent resistance network 804 includes resistances of the major pillars Pm. For illustration of the equivalent resistance network 804, each one of the major pillars Pm associated with the voltage VDDI includes resistances coupled between the power rail receiving the voltage VDD and the output terminal outputting the voltage VDDI. Correspondingly, each one of the major pillars Pm associated with the voltage VSSI includes resistances coupled between the power rail receiving the voltage VSS and the output terminal outputting the voltage VSSI. Accordingly, when the IR drop of the power delivery network 800 is calculated, the IR drop across the power rails and the conductive pillars are calculated based on the resistances of the equivalent resistance networks 802 and 804 as well as the current flowing through the same.

In some embodiments, to simplify the calculation of the IR drop of the power delivery network 800, the resistance of the equivalent resistance network 802 is ignored, because the power rails are made of, for example, upper thick metal layers. Without considering the resistance of the equivalent resistance network 802, the resistance of the equivalent resistance network 804, corresponding to the major pillars Pm, basically determines the IR drop of the power delivery network 800, in some embodiments.

For example, as shown in FIG. 8C, the power delivery network 800 includes four major pillars associated with the voltage VDD (hereinafter referred to as "VDD major pillar" for simplicity) and no intra pillar, for calculation of the IR drop. Moreover, a condition is provided that an IR drop specification is set to 50 mV, the peak current as discussed above is set to 10 mA, a resistance Rm of each one VDD major pillar is set to 50 ohm, and the resistance of the equivalent resistance network 802 is ignored as discussed above. In such a condition, a current Ip flowing through each one of the VDD major pillars is equal to (10 mA/4)=2.5 mA. Accordingly, the IR drop of the power delivery network 800 is equal to Ip×Rm=2.5 mA×50 ohm=125 mV. Because the IR drop as calculated is 125 mV which is larger than the IR drop specification of 50 mV, the IR drop of the power delivery network 800 does not meet the IR drop specification, and accordingly, the method 700 proceeds to operation S714.

In operation S714 of FIG. 7, whether the pillar density as discussed above is a maximum pillar density is determined. When the pillar density is not a maximum pillar density, the method 700 proceeds to operation S716, in which the pillar density is modified, which will be discussed in more detail below. On the other hand, when the pillar density is a maximum pillar density, the method 700 proceeds to operation S718, in which the power rails are modified, which will be discussed in more detail below. Alternatively stated, when the IR drop of the power delivery network as initially provided does not meet the IR drop specification, the power delivery network is modified. After the power delivery network is modified, the method 700 then proceeds to operations S708 and S710 again, in order to determine again whether the IR drop meets the IR drop specification. When the IR drop as calculated still does not meet the IR drop specification, the operations S714, S716 (or S718), S708, and S710 are iteratively repeated.

In some embodiments, to modify the pillar density in operation S714, at least one additional conductive pillar is added in the power delivery network as discussed above. In some embodiments, the intra pillars Pi as discussed above are added in the power delivery network. Examples are provided below for further explanation.

For example in operation S716, with reference to FIGS. 8C and 8D, the power delivery network 800 is modified to be a power delivery network 810, by adding a number of intra pillars Pi therein, and the number of the intra pillars Pi is the same as the number of the major pillars Pm. Accordingly, for example, the power delivery network 810 includes four VDD major pillars and four intra pillars associated with the voltage VDD (hereinafter referred to as "VDD intra pillar" for simplicity), for calculation of the IR drop. In such a condition, the current Ip flowing through each one of the VDD major pillars and the VDD intra pillars is (10 mA/8)=1.25 mA. Accordingly, the IR drop of the power delivery network 800 is equal to Ip×Rm=1.25 mA×50 ohm=62.5 mV. Because the IR drop as calculated is 62.5 mV which is larger than the IR drop specification of 50 mV, the IR drop of the power delivery network 810 still does not meet the IR drop specification, and accordingly, the method 700 proceeds to the operations S714, S716 (or S718), and S708 again.

For example in operation S716, with reference to FIGS. 8D and 8E, the power delivery network 810 is further modified to be a power delivery network 820, by adding a number of intra pillars Pi therein, and the number of the intra pillars Pi is the same as the number of the major pillars Pm. Accordingly, for example, the power delivery network 820 includes four VDD major pillars and eight VDD intra pillars, for calculation of the IR drop. In such a condition, the current Ip flowing through each one of the VDD major pillars and the VDD intra pillars is (10 mA/12)=0.83 mA. Accordingly, the IR drop of the power delivery network 820 is equal to Ip×Rm=0.83 mA×50 ohm=41.5 mV. Because the IR drop as calculated is 41.5 mV which is smaller than the IR drop specification of 50 mV, the IR drop of the power delivery network 820 meets the IR drop specification. Accordingly, the method 700 proceeds to the operation S712.

In some embodiments, areas of the power delivery networks 800, 810, 820 in FIGS. 8C-8E are the same, while the power delivery networks 800, 810, 820 have different numbers of the intra pillars Pi from each other. Accordingly, the pillar densities of the power delivery networks 800, 810, 820 in FIGS. 8C-8E are different from each other. For illustration, the pillar density of the power delivery network 820 is higher than the pillar density of the power delivery networks 800 and 810, and the pillar density of the power delivery network 810 is higher than the pillar density of the power delivery network 800.

As discussed above, when the pillar density is not a maximum pillar density, the method 700 proceeds to operation S716, and when the pillar density is a maximum pillar density, the method 700 proceeds to operation S718. In some embodiments, to modify the power rails in operation S718, at least one additional power rail is added in the power delivery network as discussed above. In some embodiments, at least one power rail in the conductive layer Mt−1, or in the top conductive layer Mt, is added in the power delivery network.

In some embodiments, after the modification of the power rails in operation S718, the IR drop of the power delivery network may not meet the IR drop specification in S710, but the pillar density of the modified power delivery network will not be the maximum pillar density, because there is already at least one additional power rail available for additional pillars to be added. In such embodiments, the method 700 will proceed to operations S716, S708, and S710 again, until the IR drop of the modified power delivery network meets the IR drop specification.

The above illustrations include exemplary operations, but the operations are not necessarily performed in the order shown. Operations may be added, replaced, changed order, and/or eliminated as appropriate, in accordance with the spirit and scope of various embodiments of the present disclosure. For example, in various embodiments, the operation S706 is performed before the operation S704.

Figure 9:
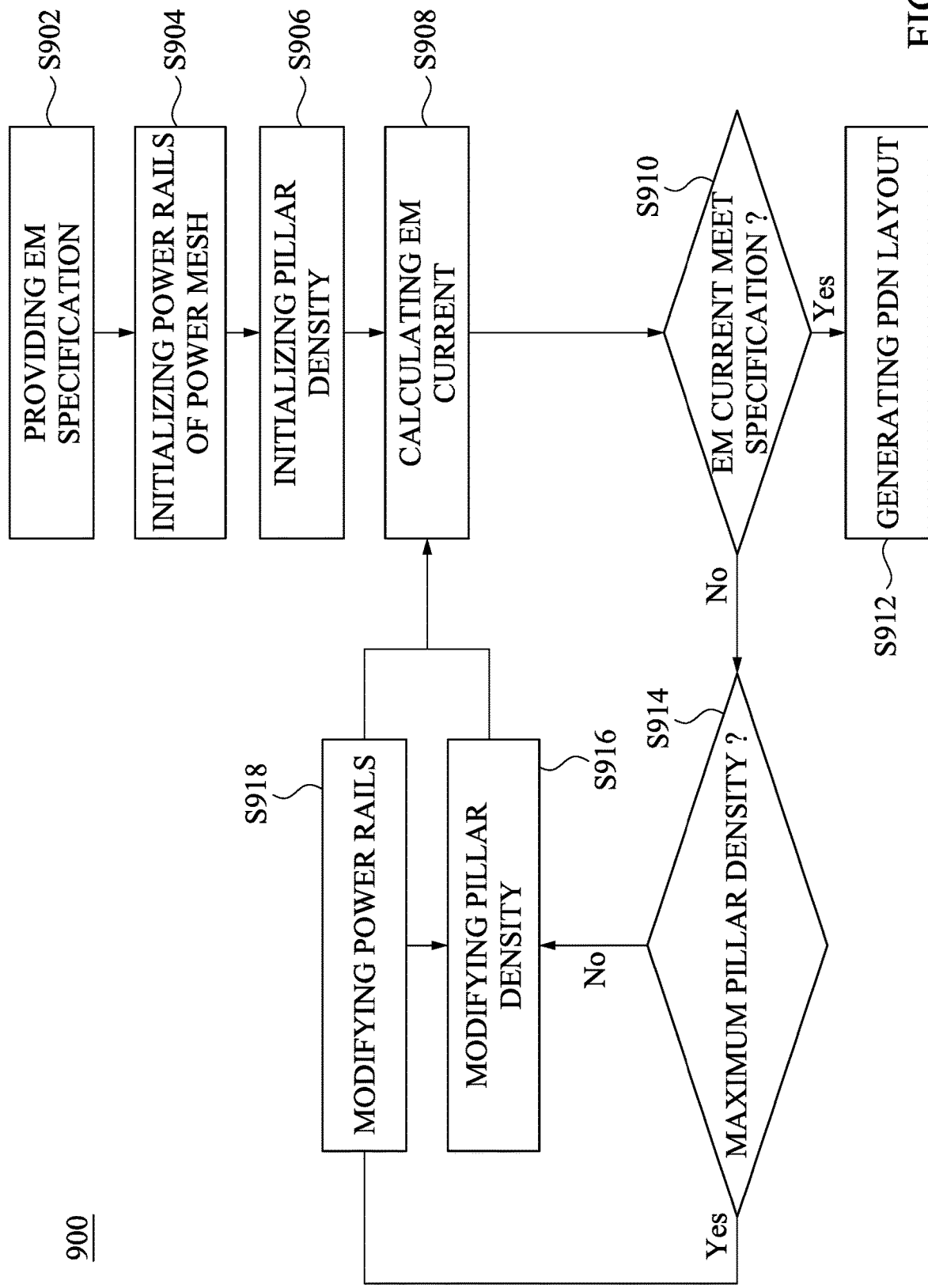
FIG. 9 is a flow chart of a method applicable in the EM pre-check process performed to the power delivery network as discussed with respect to FIG. 2, according to some embodiments of the present disclosure.

FIG. 9 is a flow chart of a method 900 applicable in the EM pre-check process performed to the power delivery network as discussed with respect to FIG. 2, according to some embodiments of the present disclosure. In some embodiments, the method 900 is performed by executing the EDA tools to perform the EM pre-check process to the power delivery network, in order to determine whether the EM current of the power delivery network meets the EM specification. For ease of understanding, the method 900 is also discussed with reference to FIGS. 8A-8E.

In the embodiments of FIG. 9, the method 900 includes operations S902, S904, S906, S908, S910, S912, S914, S916, and S918. Compared to the method 700 of FIG. 7, the operations S904, S906, S912, S914, S916, and S918 in FIG. 9 correspond to the operations S704, S706, S712, S714, S716, and S718, respectively. The operations S902, S908, and S910 in FIG. 9 are different from those in FIG. 7, and will be discussed in more detail below.

Compared to the operation S702 of FIG. 7, in operation S902 of FIG. 9, an EM specification is provided. In some embodiments, the IR drop specification includes parameters in the PDK as discussed above. With reference to FIG. 8A, the above parameters are associated with an EM current flowing through the power delivery network 800. In some embodiments, the EM specification is stored in a memory (e.g., memory 1310 of FIG. 13) for a processor (e.g., processor 1320 of FIG. 13) to access.

Compared to the operation S708 of FIG. 7, in operation S908 of FIG. 9, an EM current of the power delivery network is calculated. In some embodiments, to calculate the EM current of the power delivery network, a calculation of the EM current flowing through the power rails and conductive pillars that are coupled to the power rails of the power delivery network is performed, which will be discussed in more detail below.

After the operation S908, the EM current as calculated is compared with the EM specification in operation S910, to determine whether the EM current meets the EM specification. When the EM current as calculated meets the EM specification, the operation S912 is performed in which a power delivery network layout is generated, which also corresponds to the operation S130 of FIG. 1. On the other hand, when the EM current as calculated does not meet the EM specification, the method 900 proceeds to operation S914, which corresponds to those discussed with respect to FIG. 7.

For example, a condition is provided that a VDD EM specification is set to 1 mA (or 1000 μA), a major pillar EM current Im is set to 100 μA, and an intra pillar EM current Ii is set to 100 μA. In such a condition, for the power delivery network 800 of FIG. 8C, a VDD EM current flowing through the VDD major pillars and the VDD intra pillars is equal to (Im×4)+(Ii×0)=(100 μA×4)+(100 μA×0) =400 μA. Because the EM current as calculated is 400 μA which is smaller than the EM specification of 1 mA (or 1000 μA), the EM current of the power delivery network 800 of FIG. 8C does not meet the EM specification, and accordingly, the method 900 of FIG. 9 proceeds to operation S914 and then operations S916 (or S918) and S908.

Correspondingly, after operation S916, the power delivery network 800 of FIG. 8C is modified to be the power delivery network 810 as shown in FIG. 8D. In such a condition, the VDD EM current flowing through the VDD major pillars and the VDD intra pillars is equal to (Im×4)+(Ii×4)=(100 μA×4)+(100 μA×4)=800 μA. Because the EM current as calculated is 800 μA which is still smaller than the EM specification of 1 mA (or 1000 μA), the EM current of the power delivery network 810 does not meet the EM specification, and accordingly, the method 900 of FIG. 9 proceeds to operation S914 and then operations S916 (or S918) and S908 again.

Correspondingly, after operation S916, the power delivery network 810 of FIG. 8D is modified to be the power delivery network 820 as shown in FIG. 8E. In such a condition, the VDD EM current flowing through the VDD major pillars and the VDD intra pillars is equal to (Im×4)+(Ii×8)=(100 μA×4)+(100 μA×8)=1200 μA. Because the EM current as calculated is 1200 μA which is larger than the EM specification of 1 mA (or 1000 μA), the EM current of the power delivery network 820 of FIG. 8E meets the EM specification. Accordingly, the method 900 proceeds to the operation S912.

The above numbers of major pillars Pm and intra pillars Pi in FIGS. 8C-8E are given for illustrative purposes. Various numbers of major pillars Pm and intra pillars Pi are within the contemplated scope of the present disclosure. For example, in various embodiments, additional intra pillars Pi are further added in the power delivery network 820 of FIG. 8E, which will be discussed in more detail with reference to FIG. 10.

Figure 10:
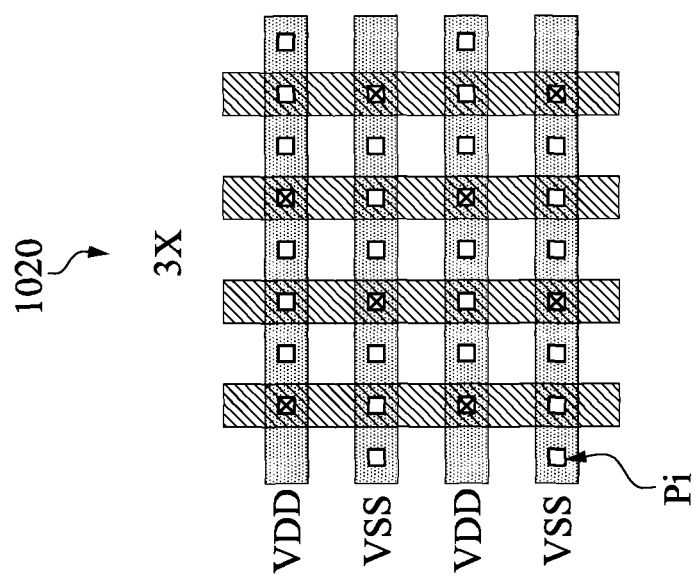
FIG. 10 is a schematic diagram illustrating other variations of the power delivery network of FIG. 8A, according to various embodiments of the present disclosure.

FIG. 10 is a schematic diagram illustrating other variations of the power delivery network 800 of FIG. 8A, according to various embodiments of the present disclosure. For illustration of FIG. 10, a power delivery network corresponding to the power delivery network 800 of FIG. 8A is modified to be a power delivery network 1020.

Compared to the power delivery network 820 of FIG. 8E, the power delivery network 1020 includes more intra pillars Pi, and the number of the intra pillars Pi in the power delivery network 1020 is three times (3×) of the number of the major pillars Pm in the power delivery network 820. Alternatively stated, the total number of the pillars in the power delivery network 1020 is four times (4×) of the total number of the pillars in the power delivery network 800. Accordingly, the IR drop of the power delivery network 1020 is 0.25 times (0.25×) of the IR drop of the power delivery network 800, and the EM current of the power delivery network 1020 is four times (4×) of the EM current of the power delivery network 1000, based on the above discussions with respect to FIGS. 8C-8E.

With reference back to FIG. 1, although the above IR drop pre-check process and the EM pre-check process are both applicable in the pre-layout simulation during the operation S120, the IR drop pre-check process and the EM pre-check process are able to be performed independently from each other, in various embodiments. Alternatively stated, in various embodiments, at least one of the IR drop pre-check process or the EM pre-check process is performed during the pre-layout simulation.

After the operation S120 including performing the IR drop pre-check process and/or the EM pre-check process, a power delivery network layout of the IC is generated based on the design of the power delivery network as discussed above, in some embodiments. After the power delivery network layout is generated, a circuit layout of the IC is generated based on the circuit design as discussed above. In some embodiments, based on the power delivery network layout and the circuit layout of the IC, at least one component in the IC is fabricated.

As discussed above, the calculation of the IR drop of the power delivery network is associated with the circuit 500 of FIG. 5, and the calculation of the EM of the power delivery network is associated with the circuit 600 of FIG. 6. To improve the accuracy of calculations of the IR drop and EM, a circuit 1100 in FIG. 11 is applicable in some embodiments.

Figure 11:
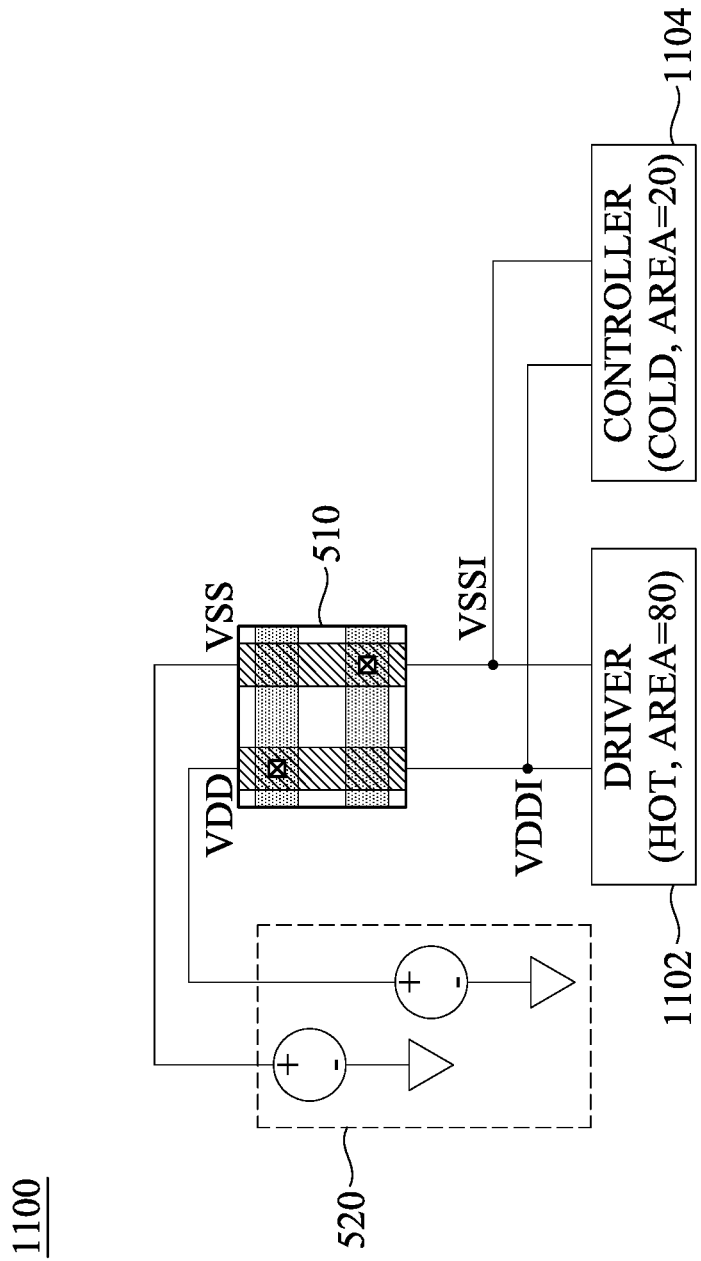
FIG. 11 is a schematic diagram of a circuit that is applicable in the IR drop and/or EM pre-check process performed to the power delivery network as discussed with respect to FIG. 2, according to various embodiments of the present disclosure.

FIG. 11 is a schematic diagram of a circuit 1100 that is applicable in the IR drop and/or EM pre-check process performed to the power delivery network as discussed with respect to FIG. 2, according to various embodiments of the present disclosure. For illustration of FIG. 11, compared to FIG. 5 or FIG. 6, the circuit 1100 includes a driver 1102 and a controller 1104, each of which is coupled to the PDN circuit 510. In some embodiments, the driver 1102 has a current consumption higher than a current consumption of the controller 1104. Accordingly, the driver 1102 is also referred to as a "hot device" while the controller 1104 is also referred to as a "cold device" in some embodiments.

To improve the accuracy of calculations of the IR drop and/or EM, a ratio of a hot device area to a total device area (e.g., hot device area plus cold device area) is used as a coefficient for calculations of the IR drop and/or EM of the power delivery network, in some embodiments. For example, when the device area of the driver 1102 is 80 and the device area of the controller 1104 is 20, the ratio is equal to 80/(80+20)=0.8. In such embodiments, the IR drop of the power delivery network is modified to a value of (IR drop)/ratio, and the EM current of the power delivery network is modified to a value of EM×ratio. Examples are provided below for further explanation.

In the examples as discussed above with respect to the power delivery network 800 of FIG. 8C, the current Ip flowing through each one of the VDD major pillars becomes (10 mA/4)/0.8=3.125 mA. Accordingly, the IR drop of the power delivery network 800 is equal to Ip×Rm=3.125 mA×50 ohm=156.25 mV. The calculation of the IR drop for other power delivery networks can be deduced by analogy, and thus they are not further details herein.

Correspondingly, in the examples as discussed above with respect to the power delivery network 800 of FIG. 8C, the VDD EM current flowing through the VDD major pillars and the VDD intra pillars is equal to (Im×4+Ii×0)×0.8=(100 μA×4+100 μA×0)×0.8=320 μA. The calculation of the EM for other power delivery networks can be deduced by analogy, and thus they are not further details herein.

As discussed above, with the power delivery network, the IR drop and/or EM pre-check process is able to be performed in the pre-layout simulation. As a result, the IR drop and/or EM issues can be optimized early in the pre-layout simulation. In addition, the power delivery network layout is able to be generated before the circuit layout is generated. Accordingly, an area of the power delivery network layout can be known or forecasted before generating the entire circuit layout, thus reducing time for the design of the entire layout, which is exemplarily discussed with reference to FIG. 12.

Figure 12:
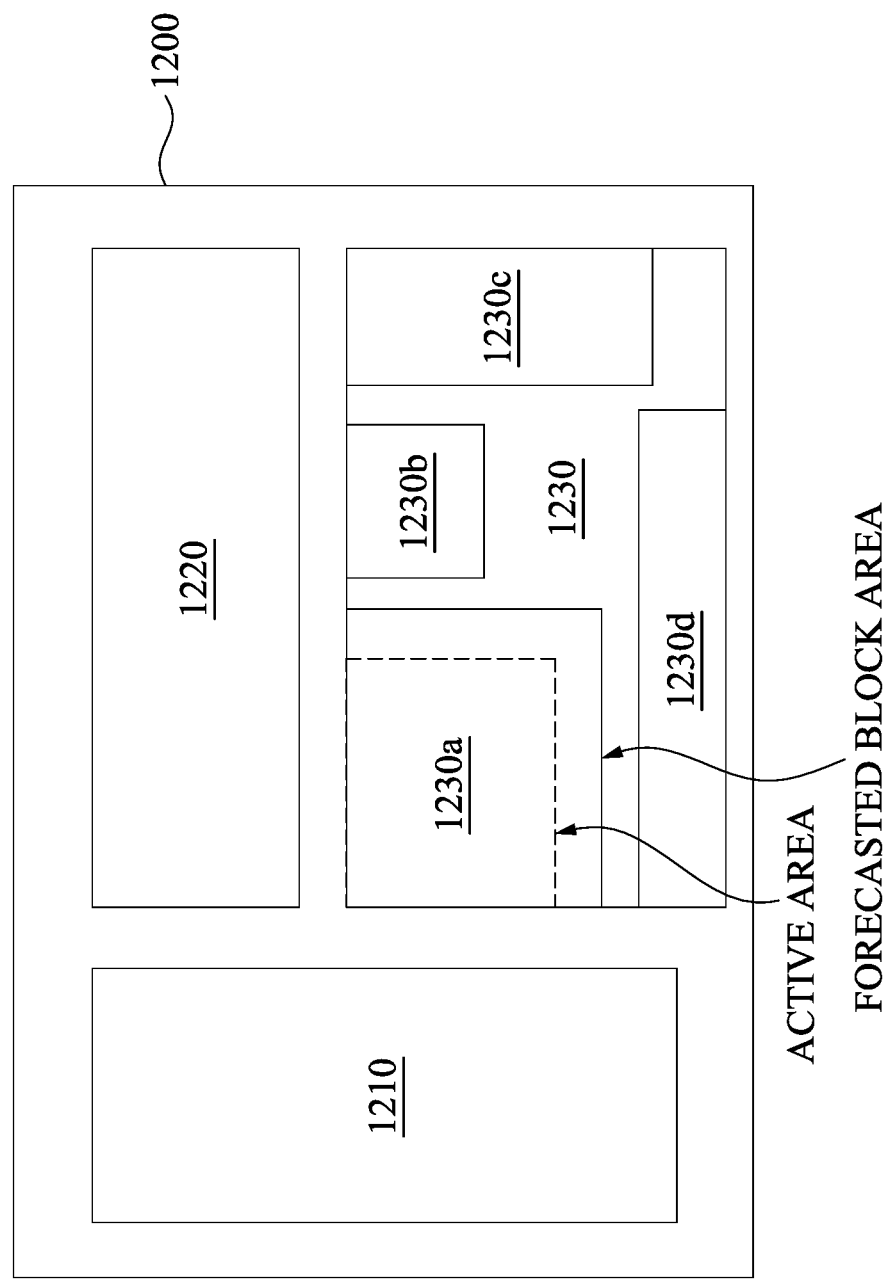
FIG. 12 is a schematic diagram of a circuit layout generated in the method of FIG. 1, according to some embodiments of the present disclosure.

FIG. 12 is a schematic diagram of a circuit layout 1200 generated in the method 100 of FIG. 1, according to some embodiments of the present disclosure. For illustration in FIG. 12, the circuit layout 1200 includes a region 1210, a region 1220, and a region 1230. In some embodiments, each one of the regions 1210 and 1220 has a fixed area in the circuit layout 1200. The region 1230 includes a block 1230a, a block 1230b, a block 1230c, and a block 1230d. In some embodiments, the block 1230a is implemented with transistors and overlaid by the power delivery network layout. Accordingly, the power delivery network layout is implemented to transmit power to the transistors in the block 1230a. In some embodiments, the block 1230a implemented with transistors is also referred to as an active area.

In some embodiments, the area of the block 1230a is determined to be larger than the area of the power delivery network layout, for example, during the method 100, the method 700, the method 900, or the combination thereof. Because the area of the block 1230a is larger than the area of the power delivery network layout, an area of the region 1230 is not required to change and is able to remain the same.

On the other hand, in some embodiments, the area of the block 1230a is determined to be smaller than the area of the power delivery network layout, for example, during the method 100, the method 700, the method 900, or the combination thereof. Because the area of the block 1230a is smaller than the area of the power delivery network layout, the area of the region 1230 is required to be enlarged to have room for the power delivery network layout to be placed, in order to prevent the power delivery network layout affects other components in the region 1230.

Based on the above, because the power delivery network layout is generated before the circuit layout 1200 is generated, as discussed above, the area of the power delivery network layout is thus known before the circuit layout 1200 is generated. Accordingly, the area of region 1230 can be estimated according to the area of the power delivery network layout. As a result, the area of the region 1230 can be forecasted. For example, in FIG. 12, when the dash box indicates the area of the block 1230a and the solid line of 1230a indicates the area of the power delivery network layout, the area of the power delivery network layout is larger than the area of the block 1230a. In such examples, the forecasted area of the bock 1230a applies the area enclosed by the solid line.

In some approaches, the area of block having transistors has to be enlarged because the area of the power delivery network layout is too large. Furthermore, the area of the power delivery network layout is known after the entire circuit layout is generated. In this situation, the entire layout design has to be reworked in order to make space for the power delivery network layout.

Compared to the above approaches, the area of the power delivery network layout can be known before the circuit layout is generated. The area of block having transistors can be forecasted before generating the entire circuit layout. Thus, if the area of the power delivery network layout is larger than the area of the block having transistors, the layout design only has to be reworked by designing the power delivery network in the early design process. The time for designing circuit layout is decreased accordingly.

Figure 13:
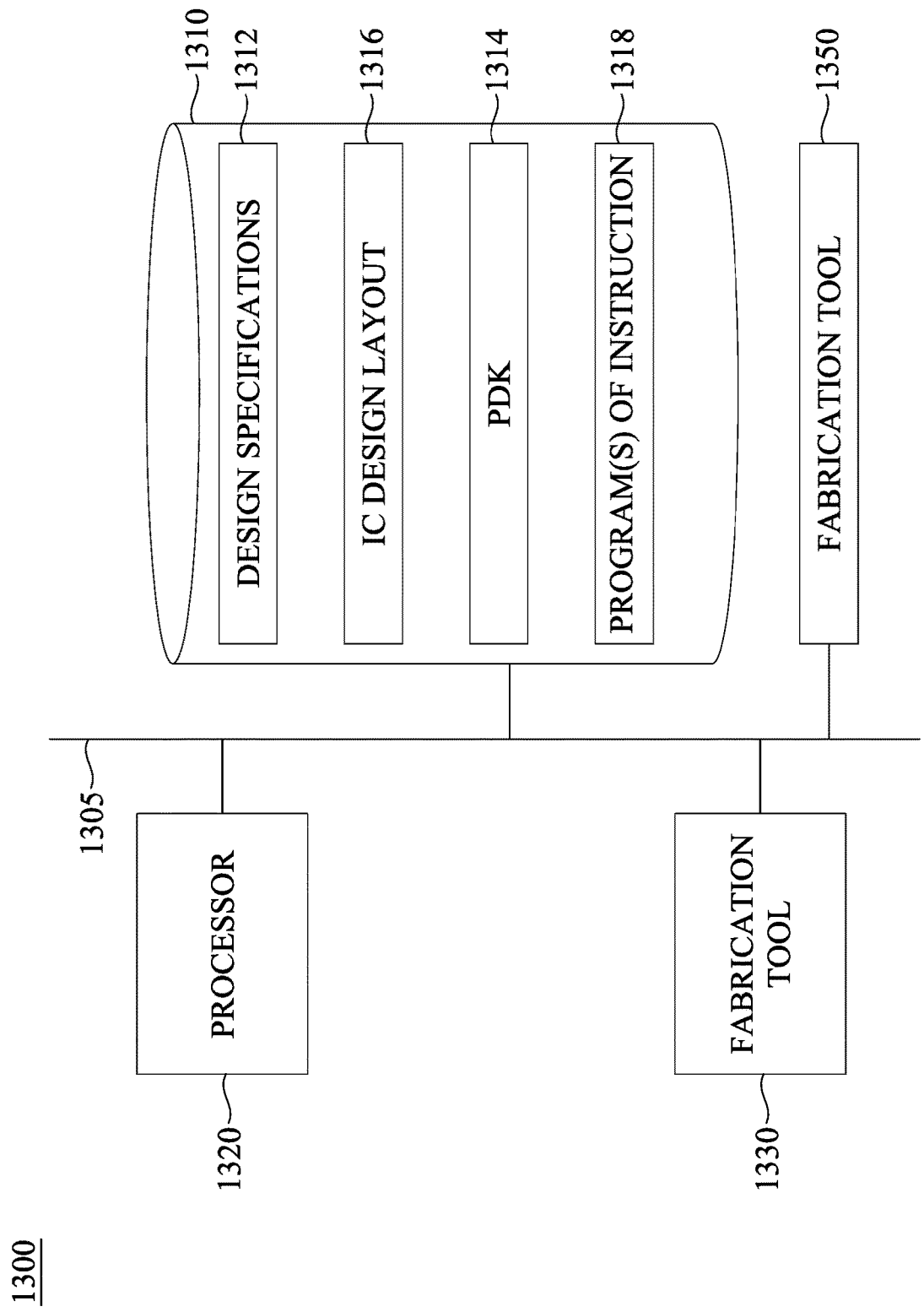
FIG. 13 is a schematic diagram of an integrated circuit (IC) design system for performing the operations with respect to FIGS. 1, 7, and 9, according to some embodiments of the present disclosure.

FIG. 13 is a schematic diagram of an integrated circuit (IC) design system 1300 for performing the operations with respect to FIGS. 1, 7, and 9, according to some embodiments of the present disclosure. In some embodiments, the design system 1300 is implemented by a computer-aided design (CAD) system. For illustration, the design system 1300 at least includes a memory 1310, a processor 1320, and a fabrication tool 1350 that are connected over a system bus 1305. The processor 1320 communicates with the memory 1310 through the system bus 1305, and access the data stored in the memory 1310 to perform the operations with respect to FIGS. 1, 7, and 9.

In some embodiments, the memory 1310 is implemented by at least one computer readable storage medium, including, for example, a computer readable storage device. In some embodiments, the memory 1310 is configured to store program(s) of instruction (e.g., electronic design automation (EDA) tool(s)) 1318 for performing the various design processes as discussed above. The memory 1310 is also configured to store design information, for example, in the form of a process design kit (PDK) 1314, for the various design processes as discussed above. In some embodiments, the design information (e.g., the PDK 1314) includes the parameters associated with the power rails and conductive pillars in the power delivery network, as discussed above. In various embodiments, the design information (e.g., the PDK 1314) also includes a set of foundry-specific files including, for example, technology files for a specific technology node, a library element library, design rules, and the like.

In some embodiments, the processor 1320 is implemented by a single specialized processor that, during IC design, performs (or that executes program(s) 1318 of instructions to perform) multiple processes as discussed above.

In some embodiments, the fabrication tool 1350 is coupled to the processor 1320. The fabrication tool 1350 is configured to fabricate integrated circuits and/or at least one component in the integrated circuits as discussed above, based on the power delivery network layout and the circuit layout of the IC as discussed above.

The numbers of the memory 1310 and the processor 1320 are given for illustrative purposes. Various numbers of the memory 1310 and the processor 1320 are within the contemplated scope of the present disclosure. For example, in various embodiments, the design system 1300 includes multiple specialized processors, and each one of the specialized processors performs one or more of the processes as discussed above.

In some embodiments, the design system 1300 is configured receive design inputs for an IC in a specific technology node including, for example, design specifications 1312 stored in the memory 1310. The processor 1320 accesses and uses the design specifications 1312 early in the design process, as discussed above, in order to generate, in a timely manner, the IC design layout 1316 that can be used to manufacture IC devices.

In some embodiments, a method is disclosed including following operations of: generating, based on design information for an integrated circuit, a circuit design that includes an initial power delivery network (PDN) for the integrated circuit; performing a pre-layout simulation to the circuit design that includes the initial power delivery network, to determine whether the circuit design meets a predetermined specification; and when the circuit design meets the predetermined specification, generating a power delivery network layout of the integrated circuit, and generating, after the power delivery network layout is generated, a circuit layout of the integrated circuit. In some embodiments, the method further includes providing the design information in a form of a process design kit (PDK) to be accessed, in which the design information includes parameters associated with power rails and conductive pillars in the initial power delivery network. In some embodiments, performing the pre-layout simulation to the circuit design that includes the initial power delivery network includes performing at least one of a voltage drop pre-check process or an electromigration pre-check process to the initial power delivery network. In some embodiments, performing the voltage drop pre-check process includes performing a calculation of a voltage drop across power rails and conductive pillars that are coupled to the power rails of the initial power delivery network. In some embodiments, performing the electromigration pre-check process includes performing a calculation of an electromigration current flowing through power rails and conductive pillars that are coupled to the power rails of the initial power delivery network. In some embodiments, the method further includes, when the circuit design does not meet the predetermined specification, modifying the initial power delivery network to be a modified power delivery network, and performing at least one of a voltage drop pre-check process or an electromigration pre-check process to the modified power delivery network. In some embodiments, modifying the initial power delivery network includes adding at least one additional conductive pillar in the initial power delivery network. In some embodiments, modifying the initial power delivery network includes adding at least one additional power rail in the initial power delivery network. In some embodiments, the method further includes, based on the power delivery network layout and the circuit layout of the integrated circuit, fabricating at least one component in the integrated circuit.

Also disclosed is a method includes following operations of: performing at least one of a voltage drop pre-check process or an electromigration pre-check process to a circuit design that includes a power delivery network (PDN); generating, when the circuit design meets a predetermined specification, a power delivery network layout of a design layout for an integrated circuit; generating, after the power delivery network layout is generated, a circuit layout of the design layout for the integrated circuit; performing a voltage drop and electromigration verification process to the design layout; and generating, when voltage drop and electromigration requirements are met during the voltage drop and electromigration verification process, a final design layout for the integrated circuit. In some embodiments, performing the voltage drop pre-check process includes performing a calculation of a voltage drop across power rails and conductive pillars that are coupled to the power rails of the power delivery network, to determine whether the circuit design meets a predetermined specification. In some embodiments, performing the voltage drop pre-check process further includes, when the circuit design does not meet the predetermined specification, increasing a pillar density of the power delivery network by adding at least one additional conductive pillar in the power delivery network. In some embodiments, performing the voltage drop pre-check process further includes, when the pillar density of the power delivery network is a maximum pillar density of the power delivery network, modifying the power delivery network by adding at least one additional power rail in the power delivery network. In some embodiments, performing the electromigration pre-check process includes performing a calculation of an electromigration current flowing through power rails and conductive pillars that are coupled to the power rails of the power delivery network, to determine whether the circuit design meets a predetermined specification. In some embodiments, performing the electromigration pre-check process further includes, when the circuit design does not meet the predetermined specification, increasing a pillar density of the power delivery network. In some embodiments, performing the electromigration pre-check process further includes, when the pillar density of the power delivery network is a maximum pillar density of the power delivery network, modifying the power delivery network by adding at least one additional power rail in the power delivery network. In some embodiments, increasing the pillar density of the power delivery network includes adding at least one additional conductive pillar in the power delivery network, in which the power delivery network comprises conductive pillars each including vias that are coupled between a bottom layer and a top layer, and each of the at least one additional conductive pillar includes vias that are coupled between the bottom layer and a conductive layer that is below the top layer.

Also disclosed is a system that includes a memory and at least one processor. The memory is configured to store design information, for an integrated circuit, that includes parameters associated with power rails and conductive pillars that are coupled to the power rails. The at least one processor is in communication with the memory and configured to perform operations including: generating, based on the design information, a circuit design that includes a power delivery network (PDN) for the integrated circuit; performing at least one of a voltage drop pre-check process or an electromigration pre-check process to the circuit design that includes the power delivery network, to determine whether the circuit design meets a predetermined specification; generating, when the circuit design meets the predetermined specification, a power delivery network layout and then a circuit layout of a design layout for the integrated circuit; performing a voltage drop and electromigration verification process to the design layout; and generating, when voltage drop and electromigration requirements are met during the voltage drop and electromigration verification process, a final design layout for the integrated circuit. In some embodiments, to perform the voltage drop pre-check process, the at least one processor is configured to perform a calculation of a voltage drop across the power rails and the conductive pillars that are coupled to the power rails of the power delivery network. In some embodiments, to perform the electromigration pre-check process, the at least one processor is configured to perform a calculation of an electromigration current flowing through the power rails and the conductive pillars that are coupled to the power rails of the power delivery network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   generating, based on design information for an integrated circuit, a circuit design that includes an initial power delivery network (PDN) for the integrated circuit;
   performing a pre-layout simulation to the circuit design that includes the initial power delivery network, to determine whether the circuit design meets a predetermined specification;
   when the circuit design meets the predetermined specification,
      generating a power delivery network layout of the integrated circuit, and
      generating, after the power delivery network layout is generated, a circuit layout of the integrated circuit; and
   when the circuit design does not meet the predetermined specification,
      modifying the initial power delivery network according to a relationship of a pillar density of the initial power delivery network and a maximum pillar density to be a modified power delivery network.

2. The method of claim 1, further comprising:
   providing the design information in a form of a process design kit (PDK) to be accessed,
   wherein the design information includes parameters associated with power rails and conductive pillars in the initial power delivery network.

3. The method of claim 1, wherein performing the pre-layout simulation to the circuit design that includes the initial power delivery network comprises:
   performing at least one of a voltage drop pre-check process or an electromigration pre-check process to the initial power delivery network.

4. The method of claim 3, wherein performing the voltage drop pre-check process comprises:
   performing a calculation of a voltage drop across power rails and conductive pillars that are coupled to the power rails of the initial power delivery network.

5. The method of claim3, wherein performing the electromigration pre-check process comprises:
   performing a calculation of an electromigration current flowing through power rails and conductive pillars that are coupled to the power rails of the initial power delivery network.

6. The method of claim 1, further comprising:
   performing at least one of a voltage drop pre-check process or an electromigration pre-check process to the modified power delivery network.

7. The method of claim 6, wherein modifying the initial power delivery network comprises:
   adding at least one additional conductive pillar in the initial power delivery network when the pillar density of the initial power delivery network is not the maximum pillar density.

8. The method of claim 6, wherein modifying the initial power delivery network comprises:
   adding at least one additional power rail in the initial power delivery network when the pillar density of the initial power delivery network is the maximum pillar density.

9. The method of claim 1, further comprising:
   based on the power delivery network layout and the circuit layout of the integrated circuit, fabricating at least one component in the integrated circuit.

10. A method, comprising:
    performing at least one of a voltage drop pre-check process or an electromigration pre-check process to a circuit design that includes a power delivery network (PDN);
    generating, when the circuit design meets a predetermined specification, a power delivery network layout of a design layout for an integrated circuit;
    generating, after the power delivery network layout is generated, a circuit layout of the design layout for the integrated circuit;

performing a voltage drop and electromigration verification process to the design layout;
generating, when voltage drop and electromigration requirements are met during the voltage drop and electromigration verification process, a final design layout for the integrated circuit; and
modifying, when the circuit design does not meet the predetermined specification, the power delivery network according to a relationship of a pillar density of the power delivery network and a maximum pillar density to be a modified power delivery network.

11. The method of claim 10, wherein performing the voltage drop pre-check process comprises:
performing a calculation of a voltage drop across power rails and conductive pillars that are coupled to the power rails of the power delivery network, to determine whether the circuit design meets the predetermined specification.

12. The method of claim 11, wherein performing the voltage drop pre-check process further comprises:
when the circuit design does not meet the predetermined specification and the pillar density of the power delivery network is not the maximum pillar density,
increasing the pillar density of the power delivery network by adding at least one additional conductive pillar in the power delivery network.

13. The method of claim 11, wherein performing the voltage drop pre-check process further comprises:
when the circuit design does not meet the predetermined specification and the pillar density of the power delivery network is the maximum pillar density,
modifying the power delivery network by adding at least one additional power rail in the power delivery network.

14. The method of claim 10, wherein performing the electromigration pre-check process comprises:
performing a calculation of an electromigration current flowing through power rails and conductive pillars that are coupled to the power rails of the power delivery network, to determine whether the circuit design meets the predetermined specification.

15. The method of claim 14, wherein performing the electromigration pre-check process further comprises:
when the circuit design does not meet the predetermined specification and the pillar density of the power delivery network is not the maximum pillar density,
increasing the pillar density of the power delivery network.

16. The method of claim 15, wherein increasing the pillar density of the power delivery network comprises:
adding at least one additional conductive pillar in the power delivery network,
wherein the power delivery network comprises conductive pillars each including vias that are coupled between a bottom layer and a top layer, and each of the at least one additional conductive pillar includes vias that are coupled between the bottom layer and a conductive layer that is below the top layer.

17. The method of claim 14, wherein performing the electromigration pre-check process further comprises:
when the circuit design does not meet the predetermined specification and the pillar density of the power delivery network is the maximum pillar density,
modifying the power delivery network by adding at least one additional power rail in the power delivery network.

18. A system, comprising:
a memory configured to store design information, for an integrated circuit, that includes parameters associated with power rails and conductive pillars that are coupled to the power rails; and
at least one processor in communication with the memory and configured to perform operations comprising:
generating, based on the design information, a circuit design that includes a power delivery network (PDN) for the integrated circuit;
performing at least one of a voltage drop pre-check process or an electromigration pre-check process to the circuit design that includes the power delivery network, to determine whether the circuit design meets a predetermined specification;
generating, when the circuit design meets the predetermined specification, a power delivery network layout and then a circuit layout of a design layout for the integrated circuit;
performing a voltage drop and electromigration verification process to the design layout;
generating, when voltage drop and electromigration requirements are met during the voltage drop and electromigration verification process, a final design layout for the integrated circuit; and
modifying, when the circuit design does not meet the predetermined specification, the power delivery network according to a relationship of a pillar density of the power delivery network and a maximum pillar density to be a modified power delivery network.

19. The system of claim 18, wherein to perform the voltage drop pre-check process,
the at least one processor is configured to perform a calculation of a voltage drop across the power rails and the conductive pillars that are coupled to the power rails of the power delivery network.

20. The system of claim 18, wherein to perform the electromigration pre-check process,
the at least one processor is configured to perform a calculation of an electromigration current flowing through the power rails and the conductive pillars that are coupled to the power rails of the power delivery network.

* * * * *